United States Patent
Rajagopalan et al.

(10) Patent No.: US 8,241,146 B2
(45) Date of Patent: Aug. 14, 2012

(54) CASING LAYER FOR POLYURETHANE-COVERED AND POLYUREA-COVERED GOLF BALLS

(75) Inventors: Murali Rajagopalan, Fairhaven, MA (US); Kevin M. Harris, Fairhaven, MA (US); Michael J. Sullivan, Fairhaven, MA (US); Douglas E. Jones, Fairhaven, MA (US); Derek A. Ladd, Fairhaven, MA (US); Scott Cooper, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 12/361,817

(22) Filed: Jan. 29, 2009

(65) Prior Publication Data

US 2010/0190579 A1    Jul. 29, 2010

Related U.S. Application Data

(63) Continuation of application No. 12/361,687, filed on Jan. 29, 2009.

(51) Int. Cl.
*A63B 37/06* (2006.01)
(52) U.S. Cl. ...................................... 473/373
(58) Field of Classification Search .............. 473/378, 473/351, 373, 374
See application file for complete search history.

(56) References Cited

U.S. PATENT DOCUMENTS

| | | | |
|---|---|---|---|
| 3,264,272 A | 8/1966 | Rees | 260/78.5 |
| 4,351,931 A | 9/1982 | Armitage | 526/227 |
| 4,560,168 A | 12/1985 | Aoyama | 273/232 |
| 4,960,281 A | 10/1990 | Aoyama | 273/232 |
| 5,243,012 A | 9/1993 | Wicks et al. | 528/58 |
| 5,484,870 A | 1/1996 | Wu | 528/28 |
| 5,688,191 A | 11/1997 | Cavallaro et al. | 473/373 |
| 5,692,974 A * | 12/1997 | Wu et al. | 473/377 |
| 5,713,801 A | 2/1998 | Aoyama | 473/354 |
| 5,803,831 A | 9/1998 | Sullivan et al. | 473/374 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,965,669 A | 10/1999 | Cavallaro et al. | 525/221 |
| 5,981,658 A | 11/1999 | Rajagopalan et al. | 525/72 |
| 6,056,842 A | 5/2000 | Dalton et al. | 156/243 |
| 6,132,324 A | 10/2000 | Hebert et al. | 473/378 |
| 6,149,535 A | 11/2000 | Bissonnette et al. | 473/354 |
| 6,207,784 B1 | 3/2001 | Rajagopalan | 528/71 |
| 6,386,992 B1 | 5/2002 | Harris et al. | 473/371 |
| 6,503,156 B1 | 1/2003 | Sullivan | 473/374 |
| 6,506,130 B2 | 1/2003 | Sullivan | 473/374 |
| 6,632,147 B2 | 10/2003 | Cavallaro et al. | 473/374 |
| 6,677,401 B2 * | 1/2004 | Boehm et al. | 525/72 |
| 6,958,379 B2 | 10/2005 | Wu et al. | 528/64 |
| 2001/0009310 A1 | 7/2001 | Hebert et al. | 264/129 |
| 2001/0018375 A1 | 8/2001 | Hayashi et al. | 473/371 |
| 2001/0019971 A1 | 9/2001 | Hayashi et al. | 473/371 |

(Continued)

OTHER PUBLICATIONS

Final Office Action dated Jan. 5, 2010 of corresponding U.S. Appl. No. 12/361,687.

(Continued)

*Primary Examiner* — Raeann Gorden
(74) *Attorney, Agent, or Firm* — Murphy & King, P.C.

(57) ABSTRACT

This invention is related to multi-layer golf balls having at least one layer containing a neutralized high acid ionomer linked to a grafted metallocene copolymer, where the golf balls exhibit improved performance characteristics and properties.

20 Claims, 3 Drawing Sheets

U.S. PATENT DOCUMENTS

| | | | | |
|---|---|---|---|---|
| 2002/0013413 | A1 | 1/2002 | Bellinger et al. | 525/179 |
| 2002/0025862 | A1 | 2/2002 | Sullivan et al. | 473/374 |
| 2002/0028885 | A1 | 3/2002 | Sullivan et al. | 525/221 |
| 2003/0199337 | A1 | 10/2003 | Hebert et al. | 473/371 |
| 2003/0212240 | A1 | 11/2003 | Wu et al. | 528/76 |

OTHER PUBLICATIONS

Non-Final Office Action dated Jul. 9, 2010 of corresponding U.S. Appl. No. 12/361,687.

Non-Final Office Action dated Jul. 9, 2010 of corresponding U.S. Appl. No. 12/361,586.

Non-Final Office Action dated Jul. 9, 2010 of corresponding U.S. Appl. No. 12/361,631.

Final Office Action dated Nov. 7, 2011 of corresponding U.S. Appl. No. 12/361,586.

Final Office Action dated Nov. 8, 2011 of corresponding U.S. Appl. No. 12/361,631.

Final Office Action dated Feb. 14, 2011 of corresponding U.S. Appl. No. 12/361,586.

Final Office Action dated Feb. 14, 2011 of corresponding U.S. Appl. No. 12/361,631.

Non-Final Office Action dated Apr. 25, 2011 of corresponding U.S. Appl. No. 12/361,586.

Non-Final Office Action dated Apr. 25, 2011 of corresponding U.S. Appl. No. 12/361,631.

Jeff Dalton, "Compression by Any Other Name," Science and Golf IV, Proceedings of the World Scientific Congress of Golf (Eric Thain ed., Routledge, 2002).

Non-Final Office Action dated May 29, 2009 of parent U.S. Appl. No. 12/361,687.

Non-Final Office Action dated May 29, 2009 of U.S. Appl. No. 12/361,586.

Non-Final Office Action dated May 29, 2009 of U.S. Appl. No. 12/361,631.

* cited by examiner

CASING LAYER FOR POLYURETHANE-COVERED AND POLYUREA-COVERED GOLF BALLS

CROSS-REFERENCE TO RELATED APPLICATIONS

This application is a continuation of U.S. patent application Ser. No. 12/361,687, filed Jan. 29, 2009, now pending, the entire disclosure of which is incorporated by reference herein.

FIELD OF THE INVENTION

The present invention relates to an improved casing layer for multilayer golf balls. In particular, the present invention relates to partially and highly neutralized high acid ionomers for use as a casing layer in a golf ball with a thin and relatively soft cover. The partially and highly neutralized high acid ionomers are reacted with a maleic anhydride grafted metallocene copolymer to form a material suitable for use in a golf ball layer.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. Over the years, golf ball manufacturers have attempted, over the years, to manipulate the compositions of both the core and cover materials in order to satisfy the performance needs of skilled and recreational golfers. Golf ball performance can be judged by a wide spectrum of characteristics including resilience, durability, spin, and "feel" of golf balls. When formulating a composition for a golf ball, each element must be balanced to produce specific characteristics.

The combination of the solid core and ionomeric cover materials provide a ball that is durable and abrasion resistant. However, because these materials are rigid, solid balls can have a hard "feel" when struck with a club. Also, due to their construction, these balls tend to have a relatively lower spin rate and higher initial velocity, which can provide greater distance and increased accuracy off the tee but less control for greenside play.

Recently, manufacturers have investigated the use of alternative polymers, such as polyurethane, for use as golf ball covers. For example, U.S. Pat. No. 6,132,324, incorporated herein by reference, discloses a method of making a golf ball having a polyurethane cover. Polyurethanes have been recognized as useful materials for golf balls since about 1960. Polyurethane compositions are the product of a reaction between a curing agent and a polyurethane prepolymer, which is itself a product formed by a reaction between a polyol and an isocyanate.

The first commercially successful polyurethane covered golf ball was the Titleist Professional ball, first released in 1993. Subsequently, the Titleist Pro V1 ball was introduced successfully in 2000 with a solid resilient polybutadiene core, a hard ionomer casing and a polyurethane cover. The Pro V1 ball provided both professional and amateur players with long distance off of drivers and control for greenside play. However, further improvements in ball properties can be anticipated by varying the composition of the ionomer layer. The present invention relates to a further attempt to provide a ball with equal or improved properties compared to the Pro V1 achieved through the use of new compositions for use in golf ball layers.

SUMMARY OF THE INVENTION

The present invention is directed to a golf ball including a core, a cover, and a layer disposed between the core and cover, wherein the cover includes polyurea, and wherein the layer disposed between the core and cover further includes a blend including: a high acid ionomer including greater than about 16 percent acid groups by weight of the high acid ionomer, wherein up to about 70 percent of the acid groups are neutralized by a suitable cationic source; a metallocene catalyzed polymer including at least one grafted moiety, wherein the grafted moiety is selected from the group consisting of maleic anhydride, fumaric anhydride, and itaconic anhydride; and a melt flow modifier including greater than about 16 weight percent acid groups by weight of the melt flow modifier.

In one embodiment, between about 30 and about 60 percent of the acid groups are neutralized. In another embodiment, the cationic source includes at least one of the group including magnesium, sodium, potassium, cesium, calcium, barium, manganese, copper, zinc, tin, and lithium.

The blend may include about 10 to about 40 pph of the metallocene catalyzed polymer based on the total blend. In one embodiment, the blend includes about 80 to about 64 pph of the high acid ionomer based on the total blend and about 3 to about 4 pph of the melt flow modifier based on the total blend.

The present invention is also related to a golf ball including: a core; a casing layer disposed about the core, wherein the casing layer includes a blend including: a high acid ionomer including greater than about 16 percent acid groups by weight of the high acid ionomer, wherein between about 25 percent and 70 percent of the acid groups are neutralized; and a metallocene catalyzed polymer including at least one grafted moiety; and a cover, wherein the cover is cast from a polyurea material.

In this aspect of the invention, the blend may further include a melt flow modifier including greater than about 16 weight percent acid groups by weight of the melt flow modifier. In one embodiment, the blend includes about 16 to about 33 pph of the metallocene catalyzed polymer and about 84 to about 67 pph of the high acid ionomer based on the total blend. In another embodiment, the blend includes about 16 to about 33 pph of the metallocene catalyzed polymer and about 80 to about 64 pph of the high acid ionomer based on the total blend based on the total blend. In still another embodiment, the blend includes about 4 percent or less melt flow modifier by weight of the blend.

The high acid ionomer may include between about 17 and 25 weight percent acid groups. In one embodiment, the at least one grafted moiety is selected from the group consisting of maleic anhydride, fumaric anhydride, and itaconic anhydride. In another embodiment, between about 30 and about 60 percent of the acid groups are neutralized.

The present invention is also directed to a golf ball including: a core; a casing layer disposed about the core, wherein the casing layer includes a blend including: a high acid ionomer including greater than about 16 percent acid groups by weight of the high acid ionomer, wherein about 70 percent or less of the acid groups are neutralized with a metal cation; a metallocene catalyzed polymer including at least one grafted moiety; and a melt flow modifier including greater than about 16 weight percent acid groups by weight of the melt flow modifier; and a cover, wherein the cover is cast from a polyurea material.

In this aspect of the invention, the cover may have a hardness of about 30 to about 55 Shore D. In one embodiment, the at least one grafted moiety is selected from the group consisting of maleic anhydride, fumaric anhydride or itaconic anhydride. The high acid ionomer may be present in the blend in an amount of about 84 pph to about 67 pph based on the total blend, about 16 to about 33 pph of the metallocene catalyzed polymer based on the total blend, and between about 2 and 4 pph of the melt flow modifier based on the total blend.

The present invention is also related to a golf ball including: a core; a casing layer disposed about the core, wherein the casing layer includes a blend including: a high acid ionomer including greater than about 16 percent acid groups by weight of the high acid ionomer, wherein between about 25 percent and about 70 percent of the acid groups are neutralized with a metal cation; a metallocene catalyzed polymer including at least one grafted moiety; and a melt flow modifier including greater than about 16 weight percent acid groups by weight of the melt flow modifier; and a cover having a hardness of about 30 to about 55 Shore D and including a composition formed from a polyurethane prepolymer and a hydroxy-terminated curing agent, wherein the polyurethane prepolymer includes the reaction product of an isocyanate and a hydroxy-terminated component.

In this aspect of the invention, the at least one grafted moiety may be selected from the group consisting of maleic anhydride, fumaric anhydride or itaconic anhydride. In one embodiment, the high acid ionomer is present in the blend in an amount of about 84 pph to about 67 pph based on the total blend. In another embodiment, the blend includes about 10 to about 40 pph of the metallocene catalyzed polymer based on the total blend. In still another embodiment, the blend includes between about 2 and 4 pph of the melt flow modifier based on the total blend.

In one embodiment, between about 30 and 60 percent of the acid groups are neutralized in the high acid ionomer. In another embodiment, the core includes polybutadiene. In addition, the metallocene catalyzed polymer may include a copolymer of ethylene and butene and also maleic anhydride.

The present invention is also directed to a golf ball including: a core; a casing layer disposed about the core, wherein the casing layer includes a blend including: a high acid ionomer including greater than about 16 percent acid groups by weight of the high acid ionomer, wherein between about 25 percent and about 70 percent of the acid groups are neutralized with a metal cation; and a metallocene catalyzed polymer including at least one grafted moiety; and a cover including a composition formed from a polyurethane prepolymer and a hydroxy-terminated curing agent, wherein the polyurethane prepolymer includes the reaction product of an isocyanate and a hydroxy-terminated component. In one embodiment, the high acid ionomer may be present in the blend in an amount ranging from about 84 to about 67 pph based on the total blend, the metallocene catalyzed polymer may be present in the blend in an amount ranging from about 16 to about 33 pph based on the total blend.

In this aspect of the invention, the blend may further include a melt flow modifier, which may be present in the blend in an amount between about 2 and 4 pph based on the total blend. The melt flow modifier may include greater than about 16 percent acid groups by weight of the melt flow modifier.

In one embodiment, between about 30 percent and about 60 percent of the acid groups in the high acid ionomer are neutralized. In another embodiment, the at least one grafted moiety includes maleic anhydride. In still another embodiment, the core includes polybutadiene.

The present invention also relates to a golf ball including: a core; a casing layer disposed about the core, wherein the casing layer includes a blend including: a high acid ionomer including between about 17 and 25 percent acid groups by weight of the high acid ionomer, wherein between about 30 percent and about 60 percent of the acid groups are neutralized with a metal cation; and a metallocene catalyzed polymer having the following general formula:

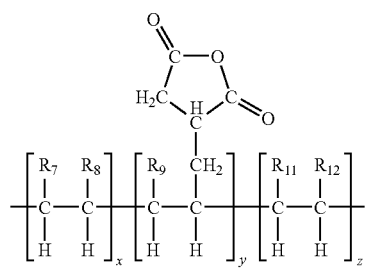

wherein $R_7$ includes a hydrogen, a linear or branched alkyl group, an aromatic or heterocyclic group, or a combination thereof; $R_8$, $R_9$, $R_{11}$, and $R_{12}$ includes a hydrogen, a lower alkyl group including 1 to 5 carbon atoms, a carbocyclic group, an aromatic or heterocyclic group, or a combination thereof; and x, y, and z are the relative percentages of each co-monomer, wherein x ranges from 1 percent to 99 percent, y ranges from 99 percent to 1 percent, and z ranges from 0 percent to 49 percent; and a cover including a composition formed from a polyurethane prepolymer and a hydroxy-terminated curing agent, wherein the polyurethane prepolymer includes the reaction product of an isocyanate and a hydroxy-terminated component.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
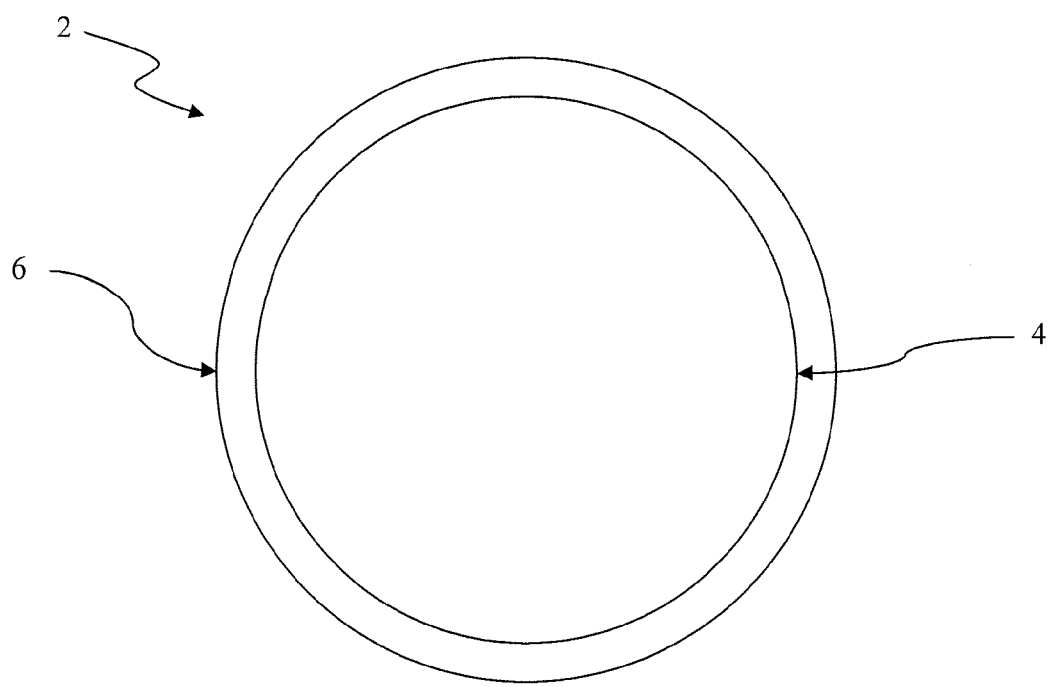
FIG. 1 is a cross-sectional view of a two-piece golf ball, wherein the core is formed from a composition of the invention.

The compositions of the invention provide an alternative to conventional ionomeric materials that are typically used as outer covers on large core balls or inner covers on multilayer balls with relatively soft covers. In particular, the compositions of the invention are based on a high acid ionomer where the acid groups have been at least partially neutralized and, in some embodiments, highly neutralized, with a maleic anhydride grafted thereto. The resulting composition may be used in any type of golf ball. In one embodiment, the golf ball includes a core and a cover and the composition of the invention is formed into a casing layer situated between the core and the cover.

The present invention also explores the methods of making such compositions and other golf ball constructions that incorporate the compositions of the invention in at least a portion thereof. In fact, the compositions of the invention can be used with a variety of golf ball constructions. For example, the compositions of the invention may be used as a cover layer in a two-piece ball with a large core, an outer cover layer in a three-piece ball with a relatively thin inner cover layer, an intermediate layer in a three-piece ball, or an inner cover layer in a golf ball having dual cover layers. The composition components, golf ball constructions, and layer and ball properties are discussed in greater detail below.

The Compositions of the Invention

The compositions of the invention may be formed by reactive blending a single partially or highly neutralized high acid ionomer with a maleic anhydride grafted metallocene copolymer. The components of the compositions of the invention are discussed below.

High Acid Ionomer

The compositions of the invention include a "high acid" ionomer. In general, ionic copolymers including up to about 16 percent acid are considered "low acid" ionomers. As used herein, the term "high acid" refers to ionomers that include greater than about 16 percent acid moieties.

A high acid ionomer suitable for use with the present invention may be a copolymer of an olefin, e.g., ethylene, and at least 16 weight percent of an α,β-ethylenically unsaturated carboxylic acid, e.g., acrylic or methacrylic acid, wherein about 10 percent to about 99 percent of the carboxylic acid groups are neutralized with a suitable cation, e.g., zinc, sodium, magnesium or lithium.

In one embodiment of the present invention, the high acid ionomer is "partially neutralized." As used herein, the term "partially neutralized" refers to acid polymers with up to about 70 weight percent of the acid groups neutralized. As such, the term "partially neutralized high acid ionomer" refers to an ionomer including greater than about 16 weight percent acid groups (by weight of the ionomer) where up to about 70 percent of the acid groups are neutralized with a suitable cation. For example, a partially neutralized high acid ionomer contemplated by the present invention may have an acid neutralization level between about 25 percent and about 70 percent. In one embodiment, the neutralization level is between about 30 percent and 60 percent. In another embodiment, the neutralization level is between about 35 percent and 55 percent.

In another embodiment of the present invention, the high acid ionomer is "highly neutralized." The term "highly neutralized" as used herein refers to acid polymers with greater than about 70 percent of the acid moieties therein neutralized. Because the high acid ionomer requires acid groups to react with the grafted metallocene, at least 1 percent of the acid groups in the ionomer must not be neutralized. Accordingly, the term "highly neutralized high acid ionomer" as used herein refers to an ionomer including greater than about 16 weight percent acid groups (by weight of the ionomer) where more than about 70 percent, but less not more 99 percent, of the acid groups in the ionomer are neutralized. For example, a highly neutralized high acid ionomer may have between about 71 percent and 99 percent of its groups neutralized, preferably about 72 percent to about 99 percent. In one embodiment, the neutralization level for a highly neutralized high acid ionomer for use with the present invention is between about 75 percent and about 98 percent, preferably about 80 to about 98 percent. In another embodiment, the neutralization level is between about 80 percent and about 96 percent, preferably about 82 percent to about 96 percent. The unneutralized acid content in the high acid ionomer may range from about 1 percent to about 28 percent, preferably about 2 percent to about 20 percent, and more preferably about 4 percent to about 18 percent.

Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351, 931, the entire disclosure of which is incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference. For example, ionomers for use with the present invention may be obtained by providing a cross metallic bond to polymers of monoolefin with at least one member selected from the group consisting of unsaturated mono- or di-carboxylic acids having 3 to 12 carbon atoms and esters thereof (the polymer contains 1 to 50 percent by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0 to 50 weight percent of the polymer (preferably 0-25 wt. %, most preferably 0-20 wt. %), and Y is acrylic or methacrylic acid present in greater than about 16 weight percent of the polymer.

In one embodiment, the high acid ionomer is a copolymer of ethylene and about 17 weight percent to about 20 weight percent (meth)acrylic acid. In another embodiment, the high acid ionomer is a copolymer of ethylene and between about 20 weight percent and about 25 weight percent meth(acrylic acid).

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals.

In the case of a highly neutralized high acid ionomer for use with the present invention, the acid copolymer may be at least partially neutralized prior to contacting the acid copolymer with a cation source to form a highly neutralized high acid ionomer.

The partially and highly neutralized high acid ionomers for use with the present invention have the following general structure:

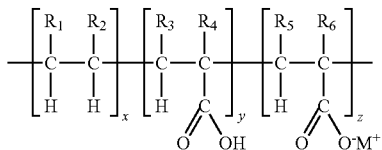

where:
- $R_1$ may be hydrogen, linear or branched alkyl such as methyl, ethyl, propyl, butyl, pentyl, hexyl, heptyl, and octyl, carbocyclic, aromatic or heterocyclic;
- $R_2$ may be hydrogen, lower alkyl including $C_1$-$C_5$, carbocyclic, aromatic or heterocyclic;
- $R_3$ may be hydrogen, lower alkyl including $C_1$-$C_5$, carbocyclic, aromatic or heterocyclic;
- $R_4$ may be hydrogen, lower alkyl including $C_1$-$C_5$, carbocyclic, aromatic or heterocyclic;
- $R_5$ may be hydrogen, lower alkyl including $C_1$-$C_5$, carbocyclic, aromatic or heterocyclic;
- $R_6$ may be hydrogen, lower alkyl including $C_1$-$C_5$, carbocyclic, aromatic or heterocyclic; and
- x, y, and z are the relative percentages of each co-monomer where the number x can range from 1 percent to 99 percent or more preferably from 10 percent to 70 percent and most preferred, from about 10 percent to about 50 percent. The number y can be from 99 percent to 1 percent, preferably, from 90 percent to 30 percent, or most preferably, 90 percent to 50 percent. The number z can range from 0 percent to 49 percent.

In one embodiment, the high acid ionomer is a copolymer of ethylene and about 17 weight percent to about 20 weight percent methacrylic acid wherein about 35 percent to about 99 percent of the carboxylic acid groups are neutralized by sodium. Examples of commercially available high acid ionomers include SURLYN® 8140, which is an ethylene-based ionomer believed to include about 17 weight percent to about 20 weight percent methacrylic acid with acid groups neutralized with sodium.

The hardness of the high acid ionomer will vary depending on the acid content and the neutralization level. In one embodiment, the high acid ionomer has a hardness ranging from at least about 50 Shore D, preferably at least about 54 Shore D, and more preferably about 58 Shore D or greater. In another embodiment, the material hardness of the ionomer is from about 60 Shore D to about 70 Shore D.

The flexural modulus of the high acid ionomer preferably ranges from about 50,000 psi to about 80,000 psi. In one embodiment, the high acid ionomer has a flexural modulus of about 55,000 psi to about 75,000 psi. In another embodiment, the high acid ionomer has a flexural modulus of about 60,000 psi to about 70,000 psi.

Grafted Metallocene Copolymer

The partially and highly neutralized high acid ionomers described above are preferably reactive blended with at least one grafted metallocene catalyzed polymer. Suitable grafted metallocene catalyzed polymers for use with the present invention may include an olefinic polymer grafted with at least one functional group such as epoxy, anhydride, amine, oxazoline, sulfonic acid, carboxylic acid and their salts. In one embodiment of the present invention, the grafted metallocene catalyzed polymer includes an anhydride group.

As used herein, the term "olefinic polymer" means a polymer, copolymer, terpolymer or terpolymer comprised of at least one olefin with attached linear or branched alkyl groups having from about 1 to about 18 carbon atoms. The term "olefinic polymer" is specifically meant to include the following materials: a polymer including an α-olefin containing from 2 to 10 carbon atoms; polymers formed with the use of metallocene catalysts and including monomers selected from the group consisting of butene, hexene, and octene; polymers formed with the use of metallocene catalysts and selected from the group consisting of a copolymer of ethylene and butene, a copolymer of ethylene and hexene and a copolymer of ethylene and octene; a terpolymer formed with the use of metallocene catalysts and consisting essentially of a polymer of ethylene, propylene, and a diene monomer; copoly(ethylene-vinyl alcohol); a copolymer consisting essentially of an-olefin monomer containing from 2 to 10 carbon atoms and an alkyl acrylate or an alkyl alkylacrylate monomer, wherein each alkyl group ranges, independently, from methyl to decyl inclusive and may be linear or branched; a copolymer consisting essentially of an-olefin monomer containing from 2 to 10 carbon atoms and a glycidyl acrylate or a glycidyl alkylacrylate monomer, wherein the alkyl group ranges from methyl to decyl inclusive and may be linear or branched; a terpolymer consisting essentially of an-olefin monomer containing from 2 to 10 carbon atoms, an alkyl acrylate or an alkyl alkylacrylate monomer, and a glycidyl acrylate or a glycidyl alkylacrylate monomer, wherein each alkyl group ranges, independently, from methyl to decyl inclusive and may be linear or branched; a copolymer consisting essentially of an-olefin monomer containing from 2 to 10 carbon atoms and a vinyloxazoline or 1-alkyl vinyloxazoline monomer, wherein the alkyl group ranges from methyl to decyl inclusive and may be linear or branched; a terpolymer consisting essentially of an-olefin monomer containing from 2 to 10 carbon atoms, an alkyl acrylate or an alkyl alkylacrylate monomer, and a vinyloxazoline or 1-alkyl vinyloxazoline monomer, wherein each alkyl group ranges, independently, from methyl to decyl inclusive and may be linear or branched; a copolymer consisting essentially of an-olefin monomer containing from 2 to 10 carbon atoms and carbon monoxide; a terpolymer consisting essentially of a first-olefin monomer containing from 2 to 10 carbon atoms, a second-olefin monomer containing from 2 to 10 carbon atoms, and carbon monoxide; a copolymer consisting essentially of an-olefin monomer containing from 2 to 10 carbon atoms and sulfur dioxide; a terpolymer consisting essentially of a first-olefin monomer containing from 2 to 10 carbon atoms, a second-olefin monomer containing from 2 to 10 carbon atoms, and sulfur dioxide; a copolymer consisting essentially of an-olefin monomer containing from 2 to 10 carbon atoms and maleic anhydride; a terpolymer consisting essentially of an-olefin monomer containing from 2 to 10 carbon atoms, maleic anhydride, and carbon monoxide; a terpolymer consisting essentially of an-olefin monomer containing from 2 to 10 carbon atoms, maleic anhydride, and sulfur dioxide; and a terpolymer consisting essentially of an-olefin monomer containing from 2 to 10 carbon atoms, maleic anhydride, and an alkyl acrylate or an alkyl alkylacrylate monomer, wherein each alkyl group ranges, independently, from methyl to decyl inclusive and may be linear or branched. Furthermore, the term "olefinic polymers" also encompasses mixtures of at least two olefinic polymers.

As used herein, the term "metallocene catalyst" refers to a single-site catalyst wherein the ancillary ligands include substituted or unsubstituted cyclopentadienyl groups. Accordingly, the term "metallocene catalyzed polymer" refers to any polymer, copolymer, or terpolymer, and, in particular, any polyolefin, polymerized using a metallocene catalyst. The term "metallocene catalyzed polymer blend" refers to any blend of a metallocene catalyzed polymer and any other type of polymer, preferably an ionomer.

As used herein, the phrase "linear or branched alkyl groups of up to about 18 carbon atoms" means any substituted or unsubstituted acyclic carbon-containing compound, including alkanes, alkenes and alkynes. As used herein, the phrase "alkyl group ranges from methyl to decyl inclusive and may be linear or branched" means any substituted or unsubstituted acyclic carbon-containing compounds, including alkanes, alkenes and alkynes.

Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, butyldiene, pentene, hexene, heptene, octene, norbornene, nonene, decene and the like. The ordinary skilled artisan is familiar with numerous linear and branched alkyl groups, which are within the scope of the present invention.

Additionally, such alkyl groups may also contain various substituents in which one or more hydrogen atoms has been "grafted" or replaced by a functional group. Functional groups include but are not limited to hydroxyl, amino, epoxy, carboxyl, sulfonic amide, ester, ether, phosphates, thiol, nitro, silane and halogen (fluorine, chlorine, bromine and iodine), to mention but a few.

Grafted metallocene catalyzed polymers for use with the invention may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

In one embodiment of the present invention, the metallocene catalyzed polymer has the following general structure:

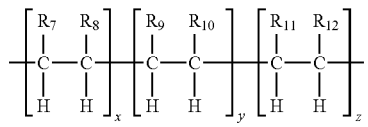

where:
$R_7$ may be hydrogen, linear or branched alkyl such as methyl, ethyl, propyl, butyl, pentyl, hexyl, heptyl, and octyl, carbocyclic, aromatic or heterocyclic;
$R_8$ may be hydrogen, lower alkyl including $C_1$-$C_5$, carbocyclic, aromatic or heterocyclic;
$R_9$ may be hydrogen, lower alkyl including $C_1$-$C_5$, carbocyclic, aromatic or heterocyclic;
$R_{10}$ may be selected from the group consisting of H, $C_nH_{2n+1}$, where n is from 1 to 18, and phenyl, in which from 0 to 5H within $R_{10}$ can be replaced by substituents selected from the group consisting of COOH, $SO_3H$, $NH_2$, F, Cl, Br, I, OH, SH, silicone, lower alkyl esters and lower alkyl ethers;
$R_{11}$ may be hydrogen, lower alkyl including $C_1$-$C_5$, carbocyclic, aromatic or heterocyclic;
$R_{12}$ may be hydrogen, lower alkyl including $C_1$-$C_5$, carbocyclic, aromatic or heterocyclic; and x, y, and z are the relative percentages of each co-monomer where the number x can range from 1 percent to 99 percent or more preferably from 10 percent to 70 percent and most preferred, from about 10 percent to about 50 percent. The number y can be from 99 percent to 1 percent, preferably, from 90 percent to 30 percent, or most preferably, 90 percent to 50 percent. The number z can range from 0 percent to 49 percent.

In one embodiment, $R_9$ and $R_{10}$ can be combined to form a bicyclic ring. For example, the metallocene catalyzed polymer may have the following general formula:

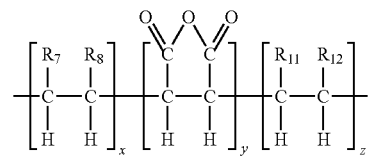

where $R_7$, $R_8$, $R_{11}$, $R_{12}$, x, y and z may be as defined above.

In another embodiment, $R_{10}$ may be functional group selected from fumaric, itaconic, or maleic anhydride. For example, with maleic anhydride having the following formula:

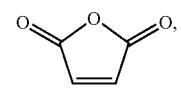

the resulting grafted metallocene catalyzed polymer will have the following general formula:

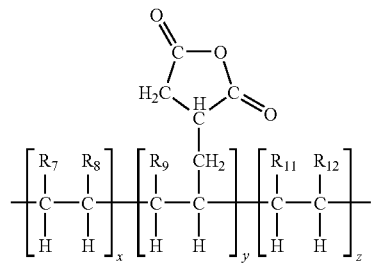

where $R_7$, $R_8$, $R_{11}$, $R_{12}$, x, y and z may be as defined above.

In one embodiment, the grafted metallocene catalyzed copolymer is a copolymer of ethylene-propylene, ethylene-butene, ethylene-hexene, ethylene-octene with a grafting moiety of maleic, fumaric, or itaconic anhydride.

As used herein, substituted and unsubstituted carbocyclic means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1-28 carbon atoms. The cyclic groups of the invention may further comprise a heteroatom.

Melt Flow Modifier

The compositions of the invention may include a melt flow modifier. In one embodiment, the melt flow modifier is an ethylene-(meth)acrylic acid copolymer with a high acid content. For example, the melt flow modifier may be an ethylene-acrylic acid copolymer with about 17 percent to about 30 percent acid groups by weight of the copolymer. In another embodiment, the melt flow modifier is an ethylene-acrylic acid copolymer with about 17 percent to about 25 percent acid groups by weight of the copolymer.

The melt flow modifier may be included in the composition in an amount ranging from about 1 percent to about 4 percent by weight of the resultant polymer. In one embodiment, the melt flow modifier is included in the composition in an amount of about 2 percent to about 4 percent by weight of the resultant polymer. In another embodiment, the melt flow modifier is included in the composition in an amount of about 3 percent to about 4 percent by weight of the resultant polymer.

Methods of Forming the Compositions of the Invention

When the partially or highly neutralized high acid ionomer is blended with a grafted metallocene catalyzed copolymer, a bond is formed between the acid group and the maleic anhydride to form an open-ended anhydride of the following structure:

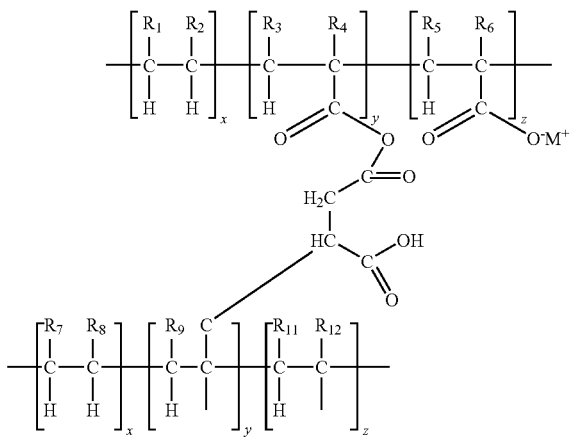

where $R_1$-$R_9$, $R_{11}$-$R_{12}$, and x, y, and z may be as defined previously.

In one embodiment, the composition includes about 1 pph to about 100 pph of at least one grafted metallocene catalyzed polymer and about 99 pph to 0 pph of at least one ionomer. In another embodiment, the grafted metallocene catalyzed polymer is present in an amount of about 10 to about 45 pph based on the total blend, preferably about 10 pph to about 40 pph based on the total blend. In yet another embodiment, the grafted metallocene catalyzed polymer is present in an amount of about 16 to about 33 pph based on the total blend, preferably about 16 to about 24 pph based on the total blend. For example, the grafted metallocene catalyzed polymer may be present in an amount of about 16 pph, 19 pph, or 24 pph based on the total blend. In still another embodiment, the grafted metallocene catalyzed polymer is present in an amount of about 14 pph to about 26 pph based on the total blend.

The high acid ionomer is preferably present in an amount of about 90 to about 55 pph based on the total blend, preferably about 90 pph to about 50 pph based on the total blend. In one embodiment, the high acid ionomer is present in an amount of about 84 to about 64 pph based on the total blend, preferably about 80 pph to about 67 pph. In another embodiment, the high acid ionomer is present in an amount of about 86 pph to about 74 pph based on the total blend.

As discussed above, the compositions of the invention preferably include a melt flow modifier. When present, the melt flow modifier is included in an amount of about 4 weight percent or less of the polymer. In one embodiment, the melt flow modifier is included in an amount of about 3 pph to about 4 pph based on the total blend. In another embodiment, the melt flow modifier is included in an amount of about 3 pph to about 4 pph based on the total blend.

The melt flow index (MFI) of the compositions of the invention may be at least about 2.0, preferably about 1.5 g/10 min using a 2.16 kg load. In one embodiment, the MFI of the compositions of the invention ranges from about 2.0 to about 4.5 g/10 min.

The compositions of the present invention may also include additional components including, but not limited to fillers, additives, and/or melt flow modifiers. For example, suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof.

The compositions of the invention may also be foamed. Suitable foaming agents include, but are not limited to, organic blowing agents, such as azobisformamide; azobisisobutyronitrile; diazoaminobenzene; N,N-dimethyl-N,N-dinitroso terephthalamide; N,N-dinitrosopentamethylenetetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process. In addition, a composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Fillers may also be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

The compositions of the present invention may also be blended with other polymers into a single composite. For example, the compositions of the invention may be present in a blend with ionomeric copolymers or terpolymers, ionomeric precursors, thermoplastics, polyamides, polycarbonates, polyesters, polyurethanes, polyureas, thermoplastic elastomers, polybutadiene rubber, balata, grafted and non-grafted metallocene-catalyzed polymers, single-site polymers, high-crystalline acid polymers, cationic polymers, cationic and anionic urethane ionomers and urethane epoxies, polyurethane ionomers, polyurea ionomers, epoxy resins, polyethylenes, polyacrylin, siloxanes, and mixtures thereof. One of ordinary skill in the art would be well aware of methods to blend these polymeric materials with the composition of the invention to form a composition for use in golf ball layers.

Golf Ball Construction

As discussed briefly above, the compositions of the present invention may be used with any type of ball construction including, but not limited to, one-piece, two-piece, three-piece, and four-piece designs, a double cover, an intermediate layer(s), and/or a multi-layer cover depending on the type of performance desired of the ball.

As used herein, the term "multilayer" means at least two layers. As used herein, the term "center" is used to reference the innermost component of the core. In some embodiments, however, the term "center" may be used interchangeably with the term "core".

When the golf ball of the present invention includes an intermediate layer, which may also include more than one layer, this layer may be incorporated with a single or multi-layer cover, or with both a single layer cover and core. The intermediate layer may be also be referred to as an inner cover layer or outer core layer, or any other layer(s) disposed between the inner core and the outer cover of a golf ball.

Referring to FIG. 1, a golf ball 2 of the present invention may include a center 4 and a cover 6 surrounding the center 4. While dimensions and materials are discussed in more detail below, a golf ball of the invention can include a large core, e.g., from about 1.55 inches to about 1.60 inches, and a relatively soft, thin cover formed from the composition of the invention.

Figure 2:
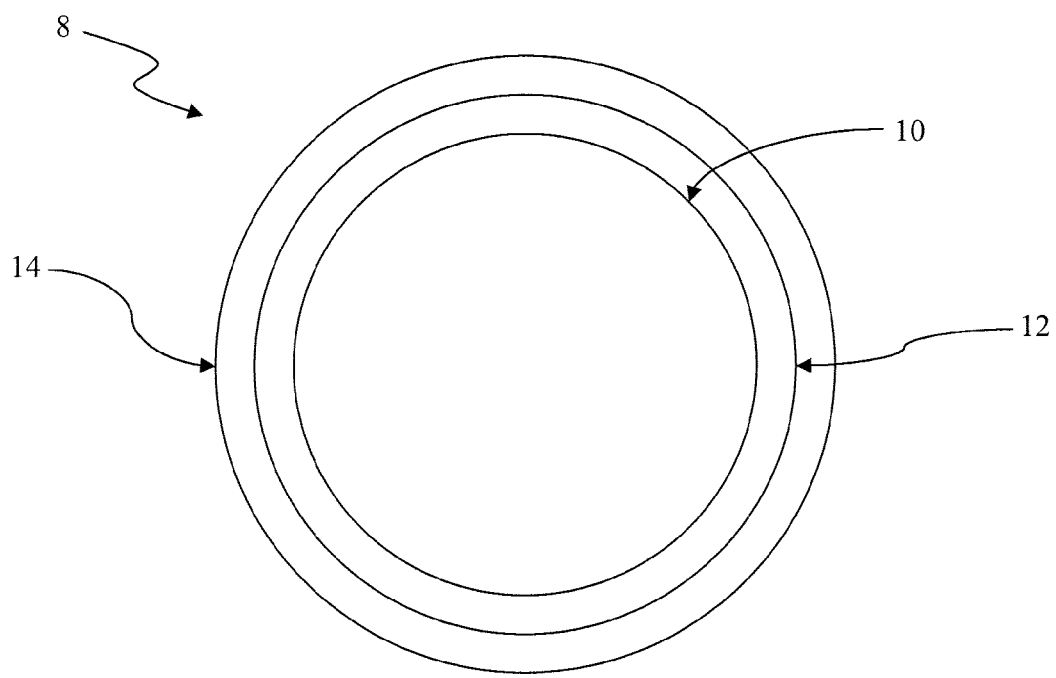
FIG. 2 is a cross-sectional view of a multi-component golf ball, wherein the core is formed from a composition of the invention.
Figure 3:
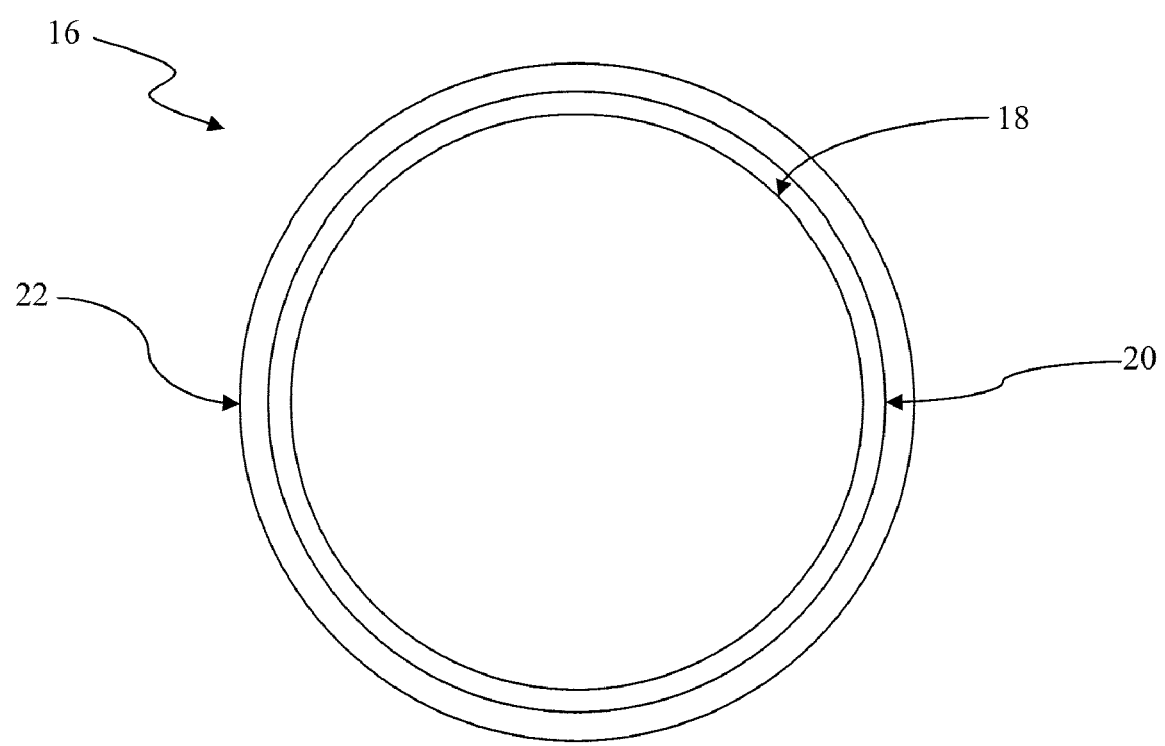
FIG. 3 is a cross-sectional view of a multi-component golf ball having a large core, wherein at least the core is formed from a composition of the invention.

Referring to FIG. 2, a golf ball 8 of the present invention may include a center 10, a cover 14, and at least one intermediate layer 12 disposed between the cover and the center. For example, in one embodiment, the compositions of the invention may be used to form the intermediate layer 12, which may be disposed between a polybutadiene core 10 and a relatively thin, i.e., about 0.02 inches to about 0.045 inches, polyurethane or polyurea cover 14. Each of the cover and center layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 16 of the present invention including a large core 18, a cover 22, and an inner cover layer 20. In one embodiment, the core 18 includes a center and an outer core layer. In one embodiment, the compositions of the invention may be used to form the inner cover layer 20, which may be disposed between a polybutadiene core 18 and a relatively thin, i.e., about 0.02 inches to about 0.045 inches, polyurethane or polyurea cover 22.

Figure 4:
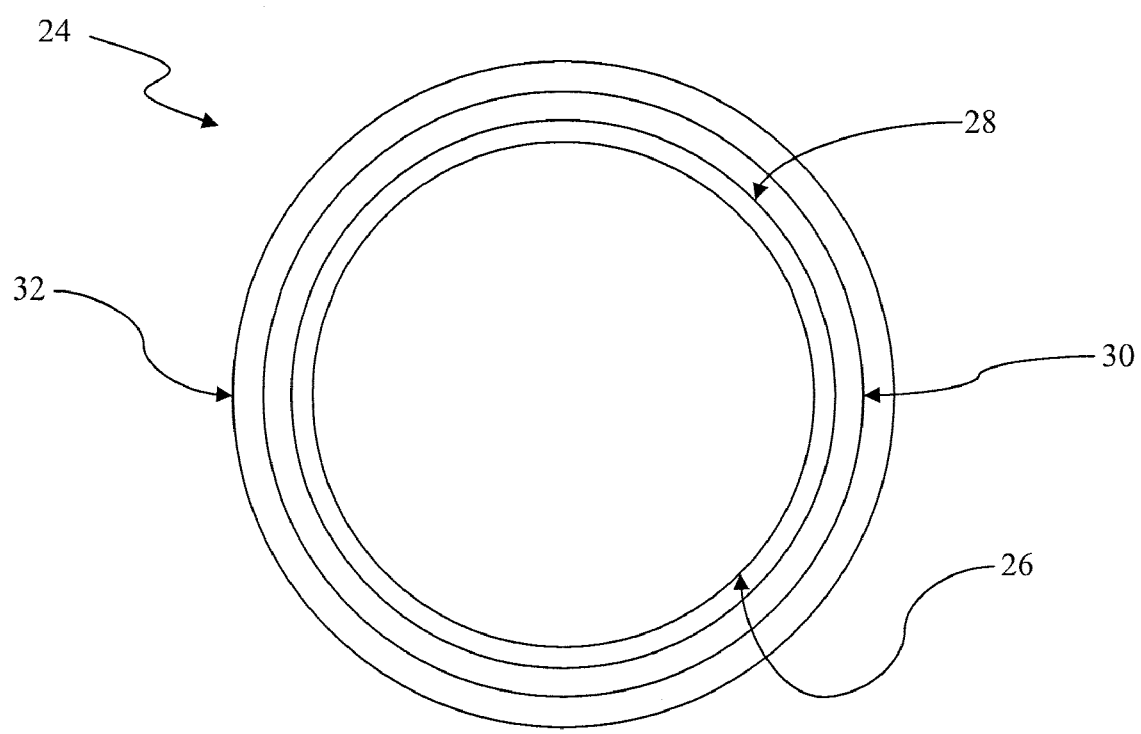
FIG. 4 is a cross-sectional view of a multi-component golf ball including a core and a dual cover, wherein at least the core is formed from a composition of the invention.

In another embodiment, as shown in FIG. 4, a golf ball 24 of the present invention may include a large core having a center 26 and an intermediate layer 28 disposed underneath a dual cover having an inner cover layer 30 and an outer cover layer 32. In one embodiment, the inner cover layer 30 is formed from the composition of the invention. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials.

In one embodiment, the intermediate layer is formed, at least in part, from the composition of the invention. For example, an intermediate layer or inner cover layer having a thickness of about 0.015 inches to about 0.06 inches may be disposed about a core to form an inner ball. In this aspect of the invention, the core, which has a diameter ranging from about 1.5 inches to about 1.59 inches, may also be formed from a composition of the invention or, in the alternative, from a conventional rubber composition. The inner ball may then be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches. The core compression is about 30 to about 110 atti, preferably about 50 to about 100 atti, and the overall ball compression preferably ranges from about 50 to about 100 atti.

In another embodiment, the intermediate layer is covered by an inner cover layer, either of which may independently be formed from the compositions of the invention. For example, a ball of the invention may include a center having a diameter of about 0.5 inches to about 1.30 inches and a compression of about 30 to about 110 atti, preferably about 50 to about 100 atti. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly(ether-amide), such as PEBAX, sold by Arkema, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In one embodiment, the intermediate layer may be a moisture barrier layer as disclosed in U.S. Pat. No. 6,632,147. Thus, a golf ball of the invention may include an intermediate layer that has a moisture vapor transmission rate lower than that of the cover and, additionally, a primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines. In another embodiment, golf balls of the invention include an intermediate layer or inner cover layer formed from the compositions of the invention and an additional moisture barrier layer.

The intermediate layer may also include a wound layer formed from a tensioned thread material. The thread may be single-ply or may include two or more plies. Suitable thread materials include, but are not limited to, fiber, glass, carbon, polyether urea, polyether block copolymers, polyester urea, polyester block copolymers, syndiotactic- or isotactic-poly(propylene), polyethylene, polyamide, poly(oxymethylene), polyketone, poly(ethylene terephthalate), poly(p-phenylene terephthalamide), poly(acrylonitrile), diaminodicyclohexyl-methane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof. Those of ordinary skill in the art are aware of the process for producing thread materials for use with the present invention.

Golf Ball Cover Layer(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from a composition of the invention. For example, the present invention contemplates a golf ball having a large core of polybutadiene and a thin cover formed from the composition of the invention.

When not formed from the composition of the present invention, the cover layer may be formed from thermoplastic or thermoset polyurethane- or polyurea-based polymers. In one embodiment of the invention, the compositions of the invention are used to form a casing layer over a core to form an inner ball, which is then covered with a polyurea or polyurethane material. Suitable polyurea and polyurethane materials for use in this aspect of the invention are discussed below.

Both polyurethane and polyureas are typically formed from an isocyanate-containing component and an isocyanate-reactive component. For example, polyureas may be prepared from at least one isocyanate and at least one amine-terminated compound, which results in a polymer with urea linkages. In contrast, polyurethanes may be prepared from at least one isocyanate and at least one hydroxy-terminated compound, which results in a polymer with urethane linkages.

Either type of material may be formed using the one-shot method or the prepolymer method. The one-shot technique reacts the isocyanate-containing component, the isocyanate-reactive component, and a curative in one step, whereas the prepolymer technique requires a first reaction between the isocyanate-reactive component(s) and an isocyanate to produce a prepolymer and a subsequent reaction between the prepolymer and a curative. Either method may be employed to produce the compositions of the invention, however, the prepolymer technique is preferred because it provides better control of chemical reaction and, consequently, results in more uniform properties for the elastomers.

Any isocyanate available to one of ordinary skill in the art is suitable for use as the isocyanate-containing component. Thus, isocyanates for use with the present invention may include aliphatic, cycloaliphatic, aromatic aliphatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic or linear or branched hydrocarbon moiety containing from about 1 to about 20 carbon atoms. When multiple cyclic groups are present, linear and/or branched hydrocarbons containing from about 1 to about 10 carbon atoms can be present as spacers between the cyclic groups. In some cases, the cyclic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of aliphatic isocyanates that can be used with the present invention include, but are not limited to, substituted and isomeric mixtures including ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diusocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); dimerized uretdione of any aliphatic polyisocyanate, such as uretdione of hexamethylene diisocyanate; modified polyisocyanate derived from the above isocyanates and polyisocyanates; and mixtures thereof.

Moreover, biurets of isocyanates and isocyanurate trimers of isocyanates are contemplated for use in the coating compositions of the invention. The general formula for each is as follows: where R and $R_1$ may be any organic radical having a valence x. In one embodiment, R is a straight or branched hydrocarbon moiety, acyclic group, cyclic group, heterocyclic group, aromatic group, phenyl group, or a mixture thereof. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

While aliphatic isocyanates are discussed primarily herein, aromatic isocyanates are also contemplated for use with the present invention.

Any amine-terminated compound available to one of ordinary skill in the art is suitable for use as the isocyanate-reactive component to form a polyurea using the one-shot method or a polyurea prepolymer that is further reacted with a curative. Again, while aromatic amine-terminated compounds are contemplated for the present invention, aliphatic amine-terminated compounds are preferred due to improved light stability of the coating composition.

The amine-terminated compounds may be in the form of a primary amine ($NH_2$), a secondary amine (NHR), or mixtures thereof. For instance, amine-terminated hydrocarbons, amine-terminated polyethers, amine-terminated polyesters, amine-terminated polycarbonates, amine-terminated polycaprolactones, amine-terminated polyamides, and mixtures thereof are contemplated for use with the present invention. Examples of suitable amine-terminated compounds and their generic structures are discussed in U.S. Pat. No. 6,958,379, the entire disclosure of which is incorporated by reference herein.

Another example of an amine-terminated compound suitable for use with the present invention is an aspartic ester, which is a secondary amine derived from a primary polyamine and a dialkyl maleic or fumaric acid ester. Suitable methods for forming aspartic esters are disclosed in U.S. Pat. No. 5,243,012, which is incorporated by reference herein. Suitable primary polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers), especially diamines, as are described herein below. Mixtures of polyamines may also be employed in preparing the aspartic esters used in the practice of this invention. Representative examples of useful maleic acid esters include dimethyl maleate, diethyl maleate, dibutyl maleate, dioctyl maleate, and mixtures thereof.

The aspartic ester derived polyureas have a number of advantageous properties, such as smooth, glossy film surface, excellent elongation (high) at a high elastomer strength, excellent ultraviolet color stability, good low temperature property retention and flexibility, slower reactivity for ease of processing and substrate wet-out (improved adhesion). Because polyurea compositions are known to have very rapid reactions, the use of an aspartic ester is beneficial because it allows a skilled artisan to slow down the polymerization reaction if desired.

Other amine-terminated compounds that may be useful in forming the polyurea coatings of the present invention include, but are not limited to, poly(acrylonitrile-co-butadiene); poly(1,4-butanediol)bis(4-aminobenzoate) in liquid or waxy solid form; linear and branched polyethylenimine; low and high molecular weight polyethylenimine having an average molecular weight of about 500 to about 30,000; poly(propylene glycol)bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

The molecular weight of the amine-terminated compound for use in the invention may range from about 100 to about 10,000. As used herein, the term "about" is used in connection with one or more numbers or numerical ranges, should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. In some cases, a higher molecular weight amine-terminated compound is preferred. For example, a suitable amine-terminated compound for use with the present invention is an amine terminated polyether, including a primary or secondary amine terminated polyether of greater than 1,500 average molecular weight, having a functionally of from about 2 to about 6, preferably from about 2 to about 3, and amine equivalent weight of from about 750 to about 4,000. Such amine-terminated polyethers are available under the tradename JEFFAMINE®, which are manufactured by Huntsman Corporation.

In addition, by using amine-terminated moieties based on a hydrophobic segment, the polyurea coating compositions of the invention may be more water resistant than those polyurea coating compositions formed with an amine-terminated hydrophilic segment. Thus, in one embodiment, the amine-terminated compound includes hydrophobic backbone, e.g., an unsaturated or saturated hydrocarbon-based amine-terminated compound, preferably saturated. One example of an amine-terminated hydrocarbon is an amine-terminated polybutadiene.

The amine-terminated compound may also be blended with additional polyols to formulate copolymers that are reacted with excess isocyanate to form a polyurea prepolymer. Once a polyol is used, however, the excess isocyanate in the polyurea prepolymer reacts with the hydroxyl groups in the polyol and forms urethane linkages, which results in a coating composition that is no longer pure polyurea, but instead a hybrid polyurea/urethane composition. Such a composition is distinct from a polyurea composition including only isocyanate, an amine-terminated compound, and a curing agent.

Any hydroxy-terminated component is suitable for use as the isocyanate-reactive component to form a polyurethane using the one-shot method or a polyurethane prepolymer that is further reacted with a curative. The hydroxy-terminated component may be aromatic, aliphatic, or aromatic-aliphatic and may include primary hydroxy terminal groups, secondary hydroxy terminal groups, or a combination thereof.

For example, suitable hydroxy-terminated components include, but are not limited to, polyether polyols, polycaprolactone polyols, polyester polyols, polycarbonate polyols, hydrocarbon polyols, and mixtures thereof. Suitable saturated polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene) glycol; poly(oxypropylene)glycol; poly(ethylene oxide capped oxypropylene)glycol; and mixtures thereof.

Saturated polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable saturated polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; and mixtures thereof. An example of a polycarbonate polyol that may be used with the present invention includes, but is not limited to, poly(hexamethylene carbonate)glycol.

Hydrocarbon polyols include, but not limited to, hydroxy-terminated liquid isoprene rubber (LIR), hydroxy-terminated polybutadiene polyol, saturated hydroxy-terminated hydrocarbon polyols, and mixtures thereof. Other aliphatic polyols that may be used to form the prepolymer of the invention include, but not limited to, glycerols; castor oil and its derivatives; Kraton polyols; acrylic polyols; acid functionalized polyols based on a carboxylic, sulfonic, or phosphoric acid group; dimer alcohols converted from the saturated dimerized fatty acid; and mixtures thereof.

When formed, polyurea or polyurethane prepolymers may contain about 10 percent to about 20 percent by weight of the prepolymer of free isocyanate monomer. Thus, in one embodiment, the prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The prepolymers may be formed with a single curing agent or a blend or mixture of curing agents. For example, any curative that promotes crosslinking of the hard segments in the prepolymer may be used in accordance with the present invention. In particular, the curing process involves the reaction of the prepolymer with an amine-terminated curing agent, a hydroxy-terminated curing agent, or a mixture thereof to crosslink the hard segments, i.e., the isocyanate groups and the amino and/or hydroxyl groups. In one embodiment, the curative includes at least one amine-terminated curing agent. In another embodiment, the curative includes at least one hydroxy-terminated curing agent. In yet another embodiment, the curative is a blend of at least one hydroxy-terminated curing agent and at least one amine-terminated curing agent. Any of the amine-terminated components and hydroxy-terminated components described above for use as the isocyanate-reactive component may be used as a curative in accordance with the invention.

Other suitable amine-terminated curatives include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 3,5-diethyltoluene-2,4-diamine; 3,5-diethyltoluene-2,6-diamine; 4,4'-bis-(sec-butylamino)-benzene; and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-ciaminocyclohexylmethane; and mixtures thereof. In one embodiment, the amine-terminated curing agent is 4,4'-bis-(sec-butylamino)-dicyclohexylmethane. The amine-terminated curative may have a molecular weight of about 64 or greater. In one embodiment, the molecular weight of the amine-terminated curative is about 2000 or less. It should be understood that molecular weight, as used herein, is the absolute weight average molecular weight and would be understood as such by one of ordinary skill in the art.

Other suitable hydroxy-terminated curatives include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4- butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol, preferably having a molecular weight ranging from about 250 to about 3900; resorcinol-di-(beta-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; N,N-bis(.beta.-hydroxypropyl)aniline; 2-propanol-1,1'-phenylaminobis; and mixtures thereof.

The hydroxy-terminated curing agent may have a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900.

The curative may include a freezing point depressing agent to slow the onset of solidification. Examples of freezing point depressing agents suitable for use in this aspect of the invention are disclosed in U.S. Patent Publication No. 2003/0212240, which is incorporated by reference herein in its entirety. In one embodiment, the freezing point depressing agent includes, but is not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

Golf Ball Core

The core of the present invention may be solid, semi-solid, hollow, fluid-filled or powder filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like.

The core may have a diameter of about 1.5 inches to about 1.62 inches. The core compression preferably ranges from about 30 to about 120 atti and the overall ball compression is about 50 to about 115.

Any core material known to one of ordinary skill in the art is suitable for use in the golf balls of the invention. In one embodiment, the core is formed from a thermoset material, such as rubber, styrene butadiene, polybutadiene, isoprene, polyisoprene, trans-isoprene. For example, butadiene rubber, which, in an uncured state, typically has a Mooney viscosity greater than about 20, preferably greater than about 30, and more preferably greater than about 40, may be used in one or more core layers of the golf balls prepared according to the present invention. In another embodiment, the core is formed from a thermoplastic material, such as ionomer resins, polyamides or polyesters, and mixtures thereof. In addition, the compositions of the present invention may be incorporated into the core.

Other materials preferred for the base polymer of the core include high-cis polybutadiene rubber that is cobalt-, nickel-, lithium-, or neodymium-catalyzed, most preferably Co- or Nd-catalyzed, having a Mooney viscosity of about 25 to about 125, more preferably about 30 to about 100, and most preferably about 40 to about 60. Lesser amounts of non-polybutadiene rubber, such as styrene butadiene rubber, trans-polyisoprene, natural rubber, butyl rubber, ethylene propylene rubber, ethylene propylene diene monomer rubber, low-cis polybutadiene rubber, or trans polybutadiene rubber, may also be blended with the polybutadiene rubber. A coagent, such as zinc diacrylate or zinc dimethacrylate, is typically present at a level of about 0 pph to about 60 pph, more preferably about 10 pph to about 55 pph, and most preferably about 15 pph to about 40 pph. A peroxide or peroxide blend is also typically present at about 0.1 pph to about 5.0 pph, more preferably about 0.5 pph to about 3.0 pph. Zinc oxide may also be present at about 5 pph to about 50 pph and the antioxidant is preferably present at about 0 pph to about 0.1 pph to about 5.0 pph, preferably about 0.5 pph to about 3.0 pph. Fillers may also be used to modify the weight of the core to create a specialty ball.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, such as the compositions of the invention, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded.

The intermediate layer and/or cover layer may also be formed using any suitable method known to those of ordinary skill in the art. For example, an intermediate layer may be formed by blow molding and covered with a dimpled cover layer formed by injection molding, compression molding, casting, vacuum forming, powder coating, and the like. in one embodiment, the compositions of the invention are extruded with a twin-screw extruded, molded into half-shells, and compression molded over a solid core as a casing layer. The cased balls may then be covered with a polyurethane or polyurea.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Any of the golf ball layers may be surface treated by conventional methods including blasting, mechanical abrasion, corona discharge, plasma treatment, and the like, and combinations thereof. In fact, because low surface energy, or surface tension, is a key feature of polysiloxanes, layers formed from the compositions of the invention may be surface treated according to U.S. Patent Publication No. 2003/0199337, the disclosure of which is incorporated in its entirety by reference herein.

Golf Ball Properties

Properties such as core diameter, intermediate layer and cover layer thickness, hardness, and compression can also be altered to affect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used. Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches. In one embodiment, the core diameter is about 1.59 inches or greater. In another embodiment, the diameter of the core is about 1.64 inches or less.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Spin Rate

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist NXT Tour® golf ball that gives a ball speed of about 159 to about 161 miles/hour, a launch angle of about 9.0 degrees to about 10.0 degrees, and a spin rate of about 2900 rpm to about 3100 rpm. Thus, in one embodiment, the spin rate of a golf ball of the invention hit with a golf club driver under the same test conditions is between about 1200 rpm to about 4200 rpm. In a preferred embodiment, the spin rate of a golf ball hit with a golf club driver is between about 2000 rpm to about 4000 rpm, more preferably between about 2500 and 3900 rpm.

For an 8-iron ball spin test, a spin rate of a golf ball struck by a standard 8-iron club was obtained by using test conditions for a Titleist NXT Tour® golf ball that gives a ball speed of about 114 to about 116 miles/hour, a launch angle of about 18.5 to about 19.5 degrees and a spin rate of about 8350 rpm to about 8550 rpm. Thus, in one embodiment, the spin rate of a golf ball with an average, cleanly struck 8-iron shot is between 5500 rpm and 10,000 rpm. In preferred embodiment, the spin rate of a golf ball of the invention with an average, cleanly struck 8-iron shot under the same test conditions is between 7500 rpm and 9500 rpm, more preferably between about 7700 rpm and 9300 rpm.

For a full wedge ball spin test, a spin rate of a golf ball struck by a standard full wedge was obtained by using test conditions for a Titleist NXT Tour® golf ball that gives a ball speed of about 93 to about 95 miles/hour, a launch angle of about 24 to about 25 degrees and a spin rate of about 9650 rpm to about 9850 rpm. Thus, in one embodiment, the spin rate of a golf ball with an average, cleanly struck full wedge shot is between 8000 rpm and 12,000 rpm. In preferred embodiment, the spin rate of a golf ball of the invention with an average, cleanly struck full wedge shot under the same test conditions is between 8500 rpm and 11,500 rpm, more preferably between about 9000 rpm and 11,000 rpm.

For a half wedge ball spin test, a spin rate of a golf ball struck by a standard half wedge was obtained by using test conditions for a Titleist NXT Tour® golf ball that gives a ball speed of about 52 to about 54 miles/hour, a launch angle of about 32 to about 34 degrees and a spin rate of about 5500 rpm to about 7500 rpm. Thus, in one embodiment, the spin rate of a golf ball with an average, cleanly struck half wedge shot is between 5000 rpm and 10,000 rpm. In preferred embodiment, the spin rate of a golf ball of the invention with an average, cleanly struck half wedge shot under the same test conditions is between 6200 rpm and 8,500 rpm, more preferably between about 6500 rpm and 8000 rpm.

Hardness

Solid sphere cores formed of the compositions of the invention preferably have a hardness of greater than about 50 Shore D, more preferably greater than about 60 Shore D, and even more preferably greater than about 65 Shore D. For example, in one embodiment, a solid sphere formed of the composition of the invention has a hardness ranging from about 55 to about 62 Shore D.

As such, if additional golf ball layers are formed of the compositions, they also preferably have hardnesses in this range. For example, a golf ball layer formed of the composition of the invention may have a hardness greater than about 55 Shore D. In one embodiment, the hardness is about 60 Shore D or greater. In another embodiment, additional golf ball layers are formed of alternative compositions with hardness ranges from about 35 Shore D to about 50 Shore D, preferably from about 40 Shore D to about 50 Shore D. Because the compositions of the invention may be used in any layer of a golf ball, the golf ball construction, physical properties, and resulting performance may vary greatly depending on the layer(s) of the ball that include the compositions of the invention.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, when an intermediate layer is formed from the compositions of the invention, the hardness of the intermediate layer may be about 55 Shore D or greater, preferably ranging from about 55 Shore D to about 65 Shore D. In yet another embodiment, the hardness of the intermediate layer is about 50 Shore D or less, preferably from about 35 Shore D to about 55 Shore D. The intermediate layer may also be about 65 Shore D or greater. For example, a golf ball of the invention may include an inner cover formed from a rosin-modified polymeric composition having a hardness of about 60 Shore D to about 75 Shore D.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 60 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression is an important factor in golf ball design. For example, the compression of the core can affect the spin rate of the ball off the driver, as well as the feel of the ball when struck with the club. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

As known to those of ordinary skill in the art, compression values are dependent on the diameter of the component being measured. The Atti compression of the core, or portion of the core, of golf balls prepared according to the invention may range from about 30 to about 110 atti, preferably about 50 to about 100 atti. In one embodiment, the core compression is less than about 80, preferably less than about 75. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 50 to 100. In yet another embodiment, the compression of the golf balls of the invention is about 75 or greater and about 95 or less. For example, a preferred golf ball of the invention may have a compression from about 80 to about 95.

Coefficient of Restitution

The coefficient of restitution or COR of a golf ball is a measure of the amount of energy lost when 2 objects collide. The COR of a golf ball indicates its ability to rebound and accounts for the spring-like feel of the ball after striking. The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.54 inches) formed of the compositions of the invention may have a COR of at least about 0.700, preferably at least about 0.710. For example, the COR of solid spheres formed from the compositions of the invention ranges from about 0.710 to about 0.760. In one embodiment, a solid sphere formed from the composition of the invention has a COR of about 0.740 to about 0.760.

Alternatively, the maximum COR of the ball is one that does not cause the golf ball to exceed initial velocity requirements established by regulating entities such as the USGA.

As used herein, the term "coefficient of restitution" (CoR) is calculated by dividing the rebound velocity of the golf ball by the incoming velocity when a golf ball is shot out of an air cannon at a steel plate. The COR is calculated by dividing the rebound velocity of the golf ball by the incoming velocity. Thus, a ball with a high coefficient of restitution dissipates a smaller fraction of its total energy when colliding with the plate and rebounding therefrom than does a ball with a low coefficient of restitution. The COR testing is conducted over a range of incoming velocities and determined at an inbound velocity of 125 ft/s. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Compositions of the Invention

Tests were performed to compare the properties of a golf balls containing a casing layer formed of the present invention. The polymer blends used for testing are listed in Table 1. Examples 1, 3, and 5 are high acid ionomer—maleic anhydride grafted metallocene catalyzed polymer blends with standard ionomer melt flow modifiers. Examples 2, 4, and 6 are representative compositions of the invention including a high acid ionomer—maleic anhydride grafted metallocene catalyzed polymer blend with high acid melt flow modifiers. Components are included in pph unless other noted.

TABLE 1

| Components | Ex. 1 | Ex. 2 | Ex. 3 | Ex. 4 | Ex. 5 | Ex. 6 | Control |
|---|---|---|---|---|---|---|---|
| Surlyn ® 8140[1] | 80.0 | | 72.0 | | 64.0 | | |
| Fusabond ® 572D[2] | 16.0 | 16.0 | 24.4 | 24.4 | 33.0 | 33.0 | |
| High Acid Ionomer[3] | | 80.0 | | 72.0 | | 64.0 | |
| Nucrel ® 960[4] | 4.0 | | 3.6 | | 3.0 | | |
| Melt Flow Modifier[5] | | 4.0 | | 3.6 | | 3.0 | |
| Surlyn ® 7940 | | | | | | | 50.0 |
| Surlyn ® 8940 | | | | | | | 50.0 |

[1]Surlyn ® 8140 is an ethylene-based ionomer believed to include about 17 weight percent to about 20 weight percent methacrylic acid with acid groups neutralized with sodium (commercially available from DuPont) with an MFI of 2.6 g/10 min.

[2]Fusabond ® 572D is a metallocene-catalyzed ethylene-butene copolymer grafted with 0.9 percent maleic anhydride and having a 4.0 MFI.

[3]High Acid Ionomer is an ethylene-acrylic acid copolymer with 17 percent acid groups, where a portion of the acid groups are partially neutralized with sodium about 30 percent to about 50 percent, with a 2.6 MFI.

[4]Nucrel ® 960 is an ethylene-acrylic acid copolymer with 15 percent acid groups having an MFI of 60 g/10 min.

[5]Flow Modifier is an ethylene-acrylic acid copolymer with 17 percent acid groups having an MFI of 60 g/10 min.

Each of the compositions listed above, with the exception of the Control, were made by carrying out reactive extrusion of the ionomeric component with a maleic anhydride grafted ethylene-butene metallocene copolymer in a twin-screw extruder.

Table 2 illustrates the flex-bar properties of each of the compositions.

TABLE 2

| Test | Ex. 1 | Ex. 2 | Ex. 3 | Ex. 4 | Ex. 5 | Ex. 6 | Control |
|---|---|---|---|---|---|---|---|
| Flexural Modulus (kpsi) | 60.1 | 55.7 | 52.2 | 51.8 | 41.7 | 41.8 | 65.8 |
| Hardness (Shore D) | 57.0 | 56.8 | 54.6 | 55.5 | 50.7 | 52.6 | 62.1 |
| Hardness (Shore C) | 88.8 | 88.7 | 86.2 | 87.8 | 82.4 | 83.7 | 91.0 |

Example 2

Cased Balls

The composition described in Example 1 were then molded into half-shells and compression molded into casing layers over polybutadiene cores. The results are shown in Table 3.

TABLE 3

| Test | Ex. 1 | Ex. 2 | Ex. 3 | Ex. 4 | Ex. 5 | Ex. 6 | Control |
|---|---|---|---|---|---|---|---|
| Average Diameter (inches) | 1.623 | 1.623 | 1.624 | 1.623 | 1.624 | 1.623 | 1.622 |
| Compression (atti) | 86.6 | 85.7 | 85.4 | 84.8 | 84.3 | 83.5 | 87.7 |
| Weight (oz.) | 1.46 | 1.46 | 1.46 | 1.46 | 1.46 | 1.46 | 1.45 |
| Hardness (Shore D) | 58.5 | 58.8 | 55.6 | 55.3 | 52.5 | 52.3 | 62.7 |
| Hardness (Shore C) | 88.7 | 87.4 | 83.9 | 84.0 | 80.6 | 80.3 | 89.7 |
| Performance Testing at 1 week | | | | | | | |
| CoR @ 125 ft/sec | .0805 | 0.805 | 0.803 | 0.803 | 0.801 | 0.800 | 0.807 |

TABLE 3-continued

| Test | Ex. 1 | Ex. 2 | Ex. 3 | Ex. 4 | Ex. 5 | Ex. 6 | Control |
|---|---|---|---|---|---|---|---|
| Air Cannon Durability Testing | | | | | | | |
| Number of Hits to 1st Failure | 121 | 191 | 210 | 198 | 265 | 311 | 151 |
| Number of Hits to 50% Failure | 225 | 244 | 342 | 235 | NR* | NR | 197 |
| Number of Hits to 100% Failure | 334 | 393 | NR | 319 | NR | NR | 257 |

*Failure level not reached.

Example 3

Solid Spheres Formed from the Compositions of the Invention

The compositions from Table 1 were also formed into solid spheres (1.550 inches). The results of these tests are shown in Table 4.

TABLE 4

| Test | Ex. 1 | Ex. 2 | Ex. 3 | Ex. 4 | Ex. 5 | Ex. 6 | Control |
|---|---|---|---|---|---|---|---|
| Average Diameter (inches) | 1.54 | 1.54 | 1.54 | 1.54 | 1.54 | 1.54 | 1.54 |
| Compression (atti) | 51.7 | 51.2 | 50.8 | 46.0 | 40.8 | 36.0 | 58.3 |
| Hardness (Shore D) | 62.7 | 62.2 | 60.4 | 59.9 | 57.0 | 56.1 | 66.9 |
| Hardness (Shore C) | 93.6 | 93.5 | 92.4 | 92.1 | 88.1 | 87.4 | 96.1 |
| Performance Testing at 1 week | | | | | | | |
| CoR@125 ft/sec | 0.743 | 0.759 | 0.735 | 0.748 | 0.716 | 0.734 | 0.754 |

Example 4

Polyurea-Covered Golf Balls of the Invention

Cased balls formed according to Example 2 were covered with a polyurea material and performance tested. Table 5 shows the results of these tests.

TABLE 5

| Test | Ex. 1 | Ex. 2 | Ex. 3 | Ex. 4 | Ex. 5 | Ex. 6 | Control |
|---|---|---|---|---|---|---|---|
| Average Diameter (inches) | 1.684 | 1.684 | 1.6831 | 1.683 | 1.683 | 1.683 | 1.683 |
| Compression (atti) | 93.9 | 93.7 | 92.5 | 91.6 | 90.3 | 89.6 | 94.8 |
| Weight (oz.) | 1.619 | 1.619 | 1.615 | 1.615 | 1.611 | 1.613 | 1.616 |
| Hardness (Shore D) | 57.1 | 57.0 | 55.4 | 55.3 | 54.2 | 53.3 | 58.5 |
| Hardness (Shore C) | 79.8 | 80.9 | 81.1 | 81.1 | 80.3 | 79.5 | 80.7 |
| Performance Testing | | | | | | | |
| CoR@125 ft/sec | 0.800 | 0.801 | 0.798 | 0.797 | 0.795 | 0.795 | 0.799 |
| Cold-Crack Test (5° F./one hit per day for 15 days) | No Failures | No Failures | No Failures | No Failures | No Failures | No Failures | No Failures |
| Spin Rate from 8-Iron (rpm) | 8419 | 8398 | 8641 | 8601 | 8886 | 8868 | 8306 |
| Launch Angle | 18.9° | 18.9° | 18.7° | 18.7° | 18.5° | 18.4° | 19.0° |
| Spin-Rate from ½ Wedge (rpm) | 7116 | 7099 | 7195 | 7158 | 7344 | 7332 | 7024 |
| Launch Angle | 31° | 31° | 30.9° | 31° | 30.6° | 30.7° | 31.1° |

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

All patents and patent applications cited in the foregoing text are expressly incorporate herein by reference in their entirety. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:

a core;

a casing layer disposed about the core, wherein the casing layer comprises a blend comprising:

a high acid ionomer comprising greater than about 16 percent acid groups by weight of the high acid ionomer, wherein between about 25 percent and about 70 percent of the acid groups are neutralized with a metal cation, a metallocene catalyzed polymer comprising at least one grafted moiety; and an unneutralized acid copolymer comprising about 17 percent to about 30 percent acid groups by weight of the unneutralized acid copolymer; and a cover having a hardness of about 30 to about 55 Shore D and comprising a composition formed from a polyurethane prepolymer and a hydroxy-terminated curing agent, wherein the polyurethane prepolymer comprises the reaction product of an isocyanate and a hydroxy-terminated component.

2. The golf ball of claim 1, wherein the at least one grafted moiety is selected from the group consisting of maleic anhydride, fumaric anhydride or itaconic anhydride.

3. The golf ball of claim 1, wherein the high acid ionomer is present in the blend in an amount of about 84 pph to about 67 pph based on the total blend.

4. The golf ball of claim 3, wherein the blend comprises about 10 to about 40 pph of the metallocene catalyzed polymer based on the total blend.

5. The golf ball of claim 4, wherein the blend comprises between about 2 and 4 pph of the unneutralized acid copolymer based on the total blend.

6. The golf ball of claim 1, wherein between about 30 and 60 percent of the acid groups are neutralized in the high acid ionomer.

7. The golf ball of claim 1, wherein the core comprises polybutadiene.

8. The golf ball of claim 1, wherein the metallocene catalyzed polymer comprises a copolymer of ethylene and butene.

9. The golf ball of claim 8, wherein the metallocene catalyzed polymer comprises maleic anhydride grafted metallocene catalyzed polymer.

10. The golf ball of claim 1, wherein the unneutralized acid copolymer has a melt flow index of 60.

11. A golf ball comprising:

a core;

a casing layer disposed about the core, wherein the casing layer comprises a blend comprising:

a high acid ionomer comprising greater than about 16 percent acid groups by weight of the high acid ionomer, wherein between about 25 percent and about 70 percent of the acid groups are neutralized with a metal cation; and a metallocene catalyzed polymer comprising at least one grafted moiety; and an unneutralized acid copolymer comprising greater than 16 percent acid groups by weight of the unneutralized acid copolymer;

a cover comprising a composition formed from a polyurethane prepolymer and a hydroxy-terminated curing agent, wherein the polyurethane prepolymer comprises the reaction product of an isocyanate and a hydroxy-terminated component.

12. The golf ball of claim 10, wherein the unneutralized acid copolymer is present in the blend in an amount between about 2 and 4 pph based on the total blend.

13. The golf ball of claim 10, wherein between about 30 percent and about 60 percent of the acid groups in the high acid ionomer are neutralized.

14. The golf ball of claim 10, wherein the at least one grafted moiety comprises maleic anhydride.

15. The golf ball of claim 10, wherein the core comprises polybutadiene.

16. The golf ball of claim 10, wherein the high acid ionomer is present in the blend in an amount ranging from about 84 to about 67 pph based on the total blend.

17. The golf ball of claim 16, wherein the metallocene catalyzed polymer is present in the blend in an amount ranging from about 16 to about 33 pph based on the total blend.

18. The golf ball of claim 11, wherein the unneutralized acid copolymer has a melt flow index of 60.

19. A golf ball comprising:

a core;

a casing layer disposed about the core, wherein the casing layer comprises a blend comprising:

a high acid ionomer comprising between about 17 and 25 percent acid groups by weight of the high acid ionomer, wherein between about 30 percent and about 60 percent of the acid groups are neutralized with a metal cation; and a metallocene catalyzed polymer having the following general formula:

$$\begin{bmatrix} R_7 & R_8 \\ | & | \\ -C-C- \\ | & | \\ H & H \end{bmatrix}_x \begin{bmatrix} R_9 & CH_2 \\ | & | \\ -C-C- \\ | & | \\ H & H \end{bmatrix}_y \begin{bmatrix} R_{11} & R_{12} \\ | & | \\ -C-C- \\ | & | \\ H & H \end{bmatrix}_z$$

with a pendant group comprising $H_2C-\underset{H}{\overset{|}{C}}-C\underset{O}{\overset{O}{\underset{\|}{C}}}-O$ wherein $R_7$ comprises a hydrogen, a linear or branched alkyl group, an aromatic or heterocyclic group, or a combination thereof; $R_8$, $R_9$, $R_{11}$, and $R_{12}$ comprises a hydrogen, a lower alkyl group comprising 1 to 5 carbon atoms, a carbocyclic group, an aromatic or heterocyclic group, or a combination thereof; and x, y, and z are the relative percentages of each co-monomer, wherein x ranges from 1 percent to 99 percent, y ranges from 99 percent to 1 percent, and z ranges from 0 percent to 49 percent; and an unneutralized acid copolymer comprising greater than 16 percent acid groups by weight of the melt flow modifier;

a cover comprising a composition formed from a polyurethane prepolymer and a hydroxy-terminated curing agent, wherein the polyurethane prepolymer comprises the reaction product of an isocyanate and a hydroxy-terminated component.

20. The golf ball of claim 19, wherein the unneutralized acid copolymer has a melt flow index of 60.

* * * * *